March 5, 1963 D. C. DAVIS ETAL 3,080,557
AUTOMATIC VIDEO SWITCHING DEVICE
Filed Dec. 7, 1959 3 Sheets-Sheet 3

INVENTORS.
DONOVON C. DAVIS
BURTON CUTLER
BY
*William T. O'Neil*
AGENT.

3,080,557
AUTOMATIC VIDEO SWITCHING DEVICE
Donovan C. Davis and Burton Cutler, Los Angeles County, Calif., assignors to Gilfillan Bros. Inc., Los Angeles, Calif., a corporation of California
Filed Dec. 7, 1959, Ser. No. 857,924
11 Claims. (Cl. 343—7.7)

This invention relates to electronic switches and more particularly to an automatic video-freqency switching device capable of automatic selection between video signal sources, as a function of a predetermined parameter of signals from one such video signal source.

In the field of radar, the use of Moving Target Indication (MTI) type receiving systems has become prevalent in keeping with the advance of the state of the art. In the present state of the art, surveillance, precision and tracking radar systems frequently have incorporated into them the usual receiving system generally referred to as "normal" and the elements of an MTI type of receiving system wherein by manual control it is possible to switch from normal to MTI operation or vice-versa. In some systems, in order to enhance MTI system operation, the MTI video is gated and operates in conjunction with the normal video. As an example, on a Plan Position Indicator (PPI) or Range Height Indicator (RHI), the MTI video might be range gated into operation from 0 range to an arbitrary range such as 5 miles, and from 5 miles out in range, "normal" video would then be displayed. This type of operation reduces the area in which the relatively inferior performance of the coherent type MTI receiver must be tolerated, (i.e., due to "blind speeds" and relatively poor signal-to-noise ratio compared to that of a "normal" receiver not employing MTI). The facts relative to said blind speeds and less favorable signal-to-noise ratio in MTI equipment compared to a normal receiver are verified and explained in considerable detail in chapter 16, particularly section 9, of the textbook "Radar System Engineering" by Ridenour (volume I of the Radiation Laboratory Series published in 1947 by McGraw-Hill Book Co., Inc., New York, N.Y.).

Both "full time" MTI systems and the limited type of combined MTI plus "normal" operation have been employed in the prior art. The combined type would most often be used to impose MTI at near ranges where ground clutter is most often a problem as within the zero to five mile ring referred to above. At such short ranges, loss of signal-to-noise ratio or overall MTI receiver sensitivity is not usually important.

Basically, the concept of combining "normal" and MTI video on a time sharing arrangement is a good one, however, the inflexibility of an MTI presentation within a fixed range ring prevents the achievement of an optimum condition. The truly optimum combination of MTI and "normal" video is one in which MTI is used only at times when it is necessary irrespective of range or angle of scan.

Thus, the overall performance of a radar system employing MTI could be greatly improved by employing the "normal" video derived from the "normal" receiver except in portions of the scan area containing heavy "clutter," at which time the MTI video would be employed. According to the present invention, automatic gating of the normal and MTI video during each receive interval is employed in a novel system capable of optimum MTI employment.

The unique automatic viedo switching device of the present invention is capable of accomplishing the above desired switching operation thus producing a new type MTI normal viedo display which effectively reduces the MTI sensitivity and blind speed problems and increases operator efficiency. The absence of blind speed effects and the maximum utilization of normal video, which generally produces stronger signals (higher signal-to-noise ratio) and more "solid" targets than MTI, will permit the operator to more easily locate and follow aircraft targets on the radar display indicator.

In the present invention, the video pulse length corresponding to a particular target, forms the basis for an automatic "decision" to switch to MTI. The comparison of delayed and undelayed video signals is utilized to determine the existence of a video train of length greater than a predetermined amount, as for example, one pulse width, to switch to MTI only when such longer video trains occur. Thus, small stationary targets, such as corner reflectors, will appear on the automatic MTI/normal display since their size produces video return of duration small compared to said predetermined amount and on the same order as that from aircraft. Therefore, the automatic video switching device of the present invention greatly enhances the operation of a radar system equipped with MTI, making possible continuous monitoring of the alignment of the display indicator, in accordance with certain desirable fixed targets, the azimuth and range of which are known (as for example, corner reflectors or other objects of short echo signal duration), while eliminating large "clutter" masses.

The added switching operation and the monitoring of two entirely different types of displays by switching from MTI to normal video and vice versa, as in certain prior art systems, tends to decrease operator efficiency and very often loss of target identification where more than one target is being monitored.

In describing the present invention, drawings are submitted briefly described as follows.

It is an object of the present invention to provide a video switching device capable of automatic switching two video sources alternatively to a radar display indicator, thereby obtaining a composite display.

It is another object of the present invention to provide an automatic video switching device capable of sensing between a first video pulse width, and a pulse width the duration of which is longer than said first pulse width.

It is yet another object of the present invention to reduce the blind speed problem encountered in MTI type operations.

It is yet another object of the present invention to present intermixed normal and MTI video to a radar display indicator.

It is yet another object of the present invention to increase operator efficiency by producing an optimized video display utilizing the benefits of MTI video with its absence of ground clutter and benefits of normal video with its absence of blind speed effects and stronger signals.

Figure 1:
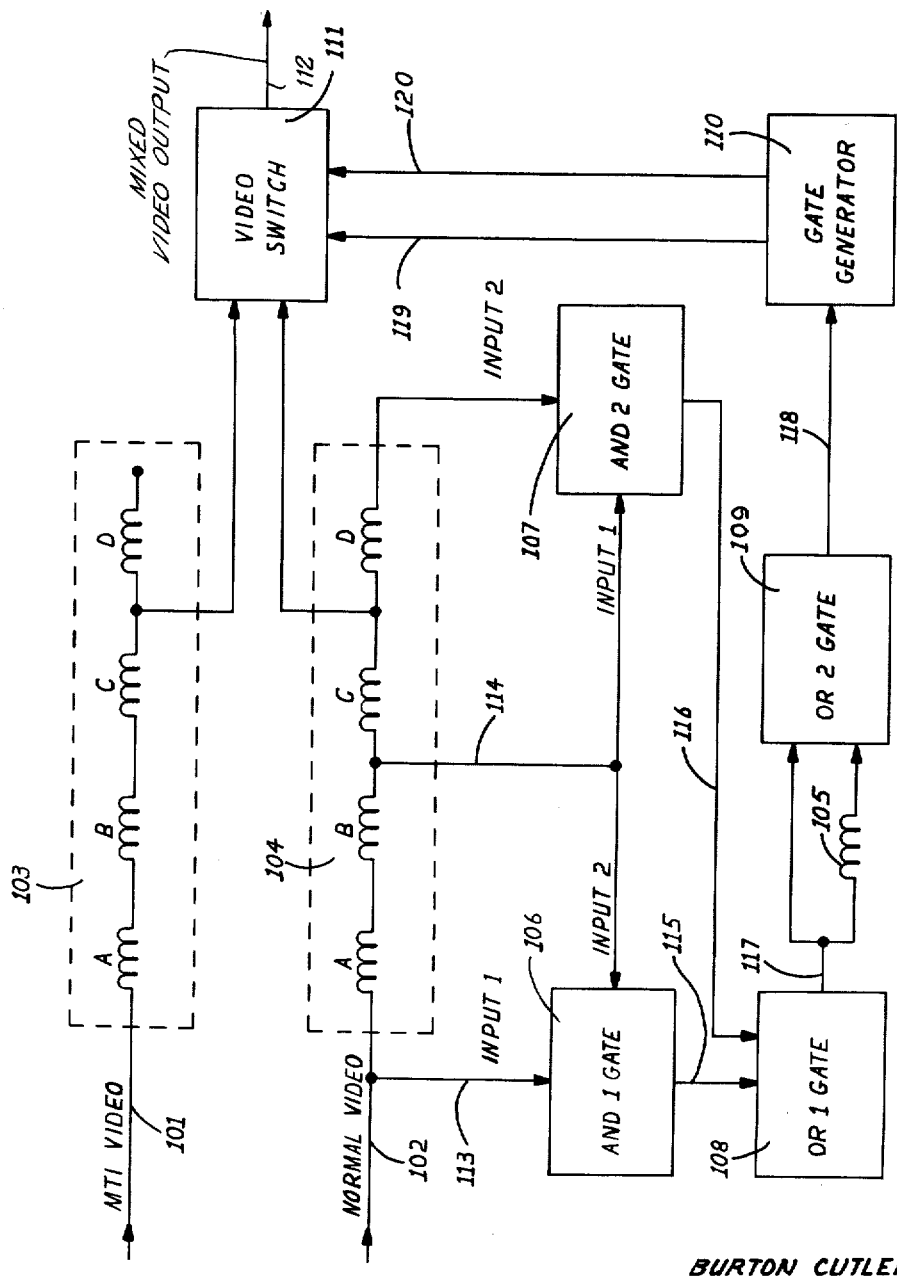
FIGURE 1 is a block diagram of the unique video switching device of the present invention.

Referring to FIGURE 1, a block diagram of the automatic video switching device of the present invention will be explained. The MTI delay line 103 and normal delay line 104, as shown, are video delay lines having essentially the same delay and bandwidth characteristics. The per-section delay in sections A, B, C, and D of each delay line is the same. In a particular embodiment, the delay time through each section is approximately one-half that of the transmitted pulse width. As an example, if the pulse width employed in a particular radar set is one-half microsecond, then each section (A, B, C, and D) of the MTI and normal delay lines 103 and 104 respectively should have a delay time of one-fourth microsecond and the overall delay time for four sections in each line is one microsecond. The normal delay line 104, sections A and B could also be lumped into one section, having a delay time equal to one pulse width (in this example, one-half microsecond). The two delay lines, if constructed in tapped form as illustrated, could be identical parts affording an economy advantage in that one design will suffice for each video input delay line (MTI and normal video 101 and 102 respectively). Gate delay line 105 has a delay time of one pulse width, i.e., it should have a delay time equal to the total delay time of delay sections A and B of the "normal" delay line 104.

Before discussing the function of each of the delay lines relative to the overall operation of the video switching device, an understanding of the function of each of the individual circuits presented in block form in FIGURE 1 is pertinent. Therefore, each block shown in FIGURE 1 will be discussed individually as to its function and circuitry relative to the overall function of FIGURE 1.

The "and 1" gate 106 and "and 2" gate 107 perform a typical logical "and" operation. The "and" circuit, often referred to as a coincidence circuit, can be designed to handle two or more inputs (in the case of illustrated embodiment of the present invention two inputs). The "and" circuit has a single output at which a gate appears if, and only if, a gate is applied simultaneously to both inputs. If the input gates are not of the same gate duration, an output gate will appear only during the time interval that the input gates overlap.

The "or 1" gate 107 and "or 2" gate 109 each perform a typical logical "or" operation. The "or" circuit in simple form is basically a buffer or mixing circuit which permits a number of gate sources of common polarity to be connected to a common load. In the case of the present invention, the "or" circuit accepts two gate sources. The "or 1" gate mixes the outputs from the "and 1" gate 106 and the "and 2" gate 107.

The "or 2" gate 109 is used in conjunction with gate delay line 105 to stretch the pulse output of the "or 1" gate 108 by an amount equal to the delay time of the gate delay line 105.

The gate generator 110 may be a typical monostable multivibrator (flip-flop) circuit, followed by a phase splitter. The change of the multivibrator from the stable state to the other state is effected with the application of a pulse or gate to its input, and return to the original or stable state occurs at the termination of said pulse. Thus, with the application of a pulse from the "or 1" gate 108, a reversal of voltage level between the two outputs 119 and 120 of the phase splitter takes place. This change in voltage level switches the MTI video "On" and the normal video "Off" i.e., only the MTI video then appears at the video output 112. Therefore, the outputs 119 and 120 of the gate generator 110 in its original or stable state should be such that video switch 111 is in the "normal" video "On" position.

The video switch 111 can be two gated amplifiers in parallel with a common output. The design should be such that no "plateau" exists, e.g., the D.C. level at the video output remains constant during switching intervals. In such an arrangement, two gates of opposite polarity are used to perform the switching function.

Since the detailed circuit design necessary to accomplish the previously explained function of each individual functional block of FIGURE 1 comprising the video switching device of the instant invention is delineated in considerable detail in various standard textbooks and the design of such circuits is well within the capabilities of the design engineer, skilled in this art, circuit details will not be given herein.

An excellent reference in the circuit design of "and" and "or" circuits is The Design of Switching Circuits, by Keister, Ritchie and Washburn, published in 1951 by the D. Van Nostrand Company, Inc., 250 Fourth Avenue, New York 3, N.Y. In particular, chapter 10, page 221 of the above reference, wherein an "and" and "or" circuit is described which is capable of accomplishing the functions of the previously discussed "and 1" gate, "and 2" gate, "or 1" gate and "or 2" gate 105, 106, 107 and 108 respectively of FIGURE 1.

Another reference relative to the circuit design of the gate generator 110 can be found in the textbook, Recurrent Electrical Transients by Von Tersch and Swago, published in 1955 by Prentice-Hall Inc., 70 Fifth Avenue, New York, N.Y. In chapter 8, page 276, paragraph 8–4, the Schmitt Trigger Circuit is discussed. This type of "flip-flop" circuit would function satisfactorily as gate generator 110. As previously discussed, the output from the "flip-flop" is fed to a phase splitter, with the output of the phase splitter in turn controlling the "on" and "off" periods of the video switch 111 in a "push-pull" fashion.

The Radiation Laboratory Series, volume 1, Radar System Engineering by Ridenour, (first edition 1947), published by the McGraw-Hill Book Company, Inc., New York, N.Y., describes a video switch in chapter 13, page 509, in particular, FIGURE 13.28 which would operate satisfactorily as video switch 111. The above discussed phase splitter is also described in this chapter, page 495, second paragraph and illustrated in FIGURE 13.11(2).

Figure 2:
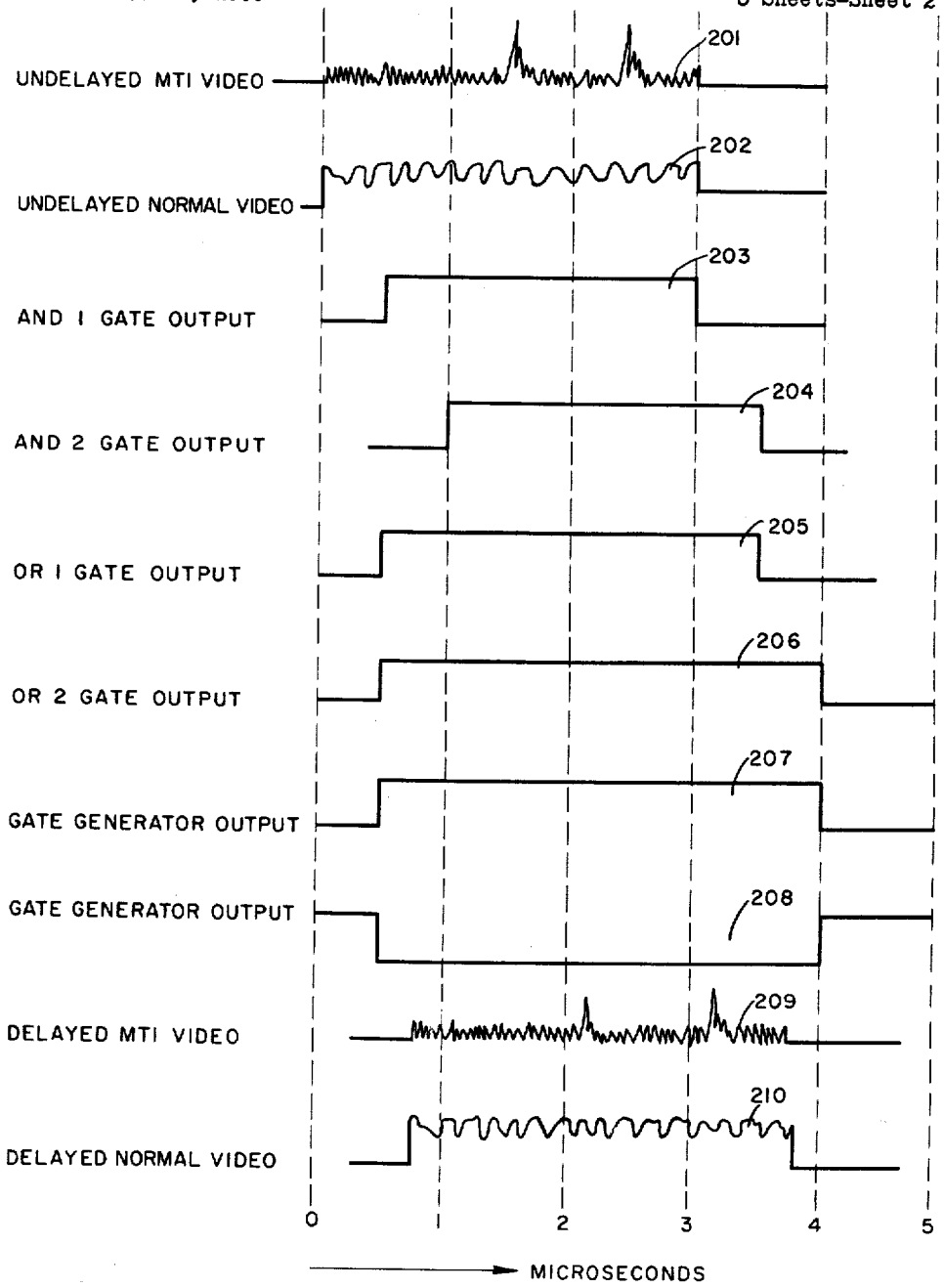
FIGURE 2 is a timing chart showing the gating sequence of the video switching device of FIGURE 1.

The timing sequence of the illustrated video switching device of the instant invention is illustrated in FIGURE 2. By way of example, assume that the normal video pulse width is one-half microsecond. Accordingly, sections A, B, C, and D of the MTI and normal delay lines 103 and 104 respectively, will have a delay of one-fourth microsecond per section. Assuming that a video pulse train three microseconds in duration arrives at the normal video input line 102 and the MTI equivalent arrives at the MTI video input line 101. These two inputs are shown in FIGURE 2 at 201 and 202, undelayed MTI and normal video respectively. This normal video pulse train 202 of FIGURE 2 is fed to input 1 of the "and 1" gate 106 through line 113. This same video pulse train also traverses sections A and B of the normal delay line 104; at this point it is fed to input 2 of the "and 1" gate 106 and input 1 of the "and 2" gate 107 by way of line 114. With the arrival of the delayed video pulse train at input 2 of the "and 1" gate 106, partial pulse coincidence takes place between the input 1 and 2 of the "and 1" gate 106 thus a gate is formed at the output of the "and 1" gate 106 which in turn is fed to input 1 of the "or 1" gate 108 via line 115. The output of the "and 1" gate 106 appearing on line 115 is shown at 203 in FIGURE 2. The leading edge of the "and 1" output gate 203 in respect to the undelayed video 202 is delayed one-half microsecond due to the delay encountered through delay line sections A and B of the normal delay line 104.

This same 3 microsecond video pulse train also traverses sections C and D of the normal delay line 104. Therefore, pulse coincidence between inputs 1 and 2 of "and 2" gate 107 occurs one-half microsecond later than pulse coincidence between inputs 1 and 2 or "and 1" gate 106. Thus, both the leading and trailing edges of the "and 2" gate 107 (waveform 204) appearing on line 116 trail the gate output appearing on line 115 by one-half microsecond and the normal video input 102 by one microsecond. It will be noted that the duration of the "and 1" gate and "and 2" gate outputs, are each one-half microsecond less than the undelayed normal video.

The output gate appearing on line 115 and 116 is fed to the "or 1" gate 108, which as previously explained, is in effect a mixing circuit. Thus, the output of gate 108 is shown in FIGURE 2 as the "or 1" gate output (waveform 205), the duration of which is the time between the leading edge of 203 and the trailing edge of 204. This gate appearing on line 117, shown in FIGURE 1, is fed directly to one input of mixing circuit, "or 2" gate 109, and through delay line 105 to the other input of 109. Therefore, the leading edge of the output gate of the "or 2" gate 109, appearing on line 118, coincides as to time with the leading edge of the "or 1" gate 108 output, but the duration of the "or 2" gate 109 output pulse on line 118 is one pulse width longer than the output pulse on line 117, due to the delay encountered in gate delay line 105 (in this example, one-half microsecond). In other words, the gate output of the "or 1" gate 108 is stretched one pulse width, thereby forming waveform 206 before entering gate generator 110 as shown in FIGURE 2.

The three and one-half-microsecond gate derived from the "or 2" gate on line 118 causes the gate generator 110 to depart from its stable condition. Thus, the outputs of the gate generator 110 appearing on lines 119 and 120 reverse polarity, which in turn causes the video switch 111 to switch into a condition whereby only the MTI video will appear at mixed video output 112, whereas prior to this period only the normal video appeared at the video output 112. The time relationship of the gates appearing at the gate generator output in respect to the undelayed MTI and normal video is shown in FIGURE 2 at 207, 208, 201 and 202, gate generator outputs and undelayed MTI and normal videos respectively. It will be noted that the undelayed MTI and normal video 201 and 202 lead the gate generator outputs 207 and 208 by one-half microsecond. Therefore, it is necessary to delay the MTI and normal video to the video switch 111. It is extremely desirable that the video switch 111 be switched into the MTI video "On" position just prior to the arrival of the MTI video, at the input of the said video switch 111, and into the normal video "On" position at least a fraction of a pulse width after the end of the MTI video pulse train corresponding to a block of "clutter" to be eliminated, for presentation of successive "normal" video. This is accomplished by delaying the MTI and "normal" video inputs 101 and 102 each one and one half pulse width (three fourth microsecond in the example situation) as shown in FIGURE 2 as delayed MTI video 209 and normal video 210. As pointed out previously, the three-fourth microsecond delay of the MTI and normal video input is accomplished by delay line sections A, B, and C of the MTI and normal video delay lines 103 and 104 respectively.

It will be realized that the duration of the gates shown in FIGURE 2 may change with each succeeding video pulse train, and that the delay time of each gate is dependent on the delay throughout the normal delay line 104. The precise amount of delay in each delay line is a design consideration depending on the transmitted pulse width and other considerations. Therefore, if the pulse width of a system utilizing the video switching device of the present invention is 0.2 microsecond, the overall delay in the normal delay line 104 might better be 0.4 microsecond (0.1 microsecond each section). The period of delay to the video switch 111 of the MTI and normal video would be in that event appropriately different, the significant consideration being that switching gates 207 and 208 "bracket" the delayed MTI video 209. It will also be apparent that a different normal video pulse (transmitted pulse duration) will have no effect on the logic of the gating circuitry of the device. Pulse coincidence between inputs 1 and 2 of the "and 1" gate 106, or the "and 2" gate 107 will not occur unless the duration of the normal video pulse train is greater than the time delay between the said inputs to the "and 1" gate 106 and "and 2" gate 107. Therefore, any "normal" video pulse, the duration of which is one-half or less than the total delay time of delay line 104 will be passed to the video output 112. During this period the MTI video will be "cutoff." Thus, any "normal" video pulse (as from "clutter"), the duration of which exceeds one-half the delay time of the normal video delay line 104 will in turn, through the action of the "and" "or" circuitry, cause a polarity reversal at the output of gate generator 110, which in turn will cause the video switch into the MTI video "On" position. All action of the circuitry is independent of overall system timing and therefore "clutter" at any range within the radar system capability will operate the logic circuits. Variation of the range of "clutter" with angular scan is equally well handled, since the system of the present invention references itself on each range sweep (each transmitted pulse). Armed with an understanding of the present invention, it will be obvious to those skilled that variations of the instrumentation are well within the skill of those versed in the art. For just one example, the "normal" video pulse train could be amplified, the amplified "clutter" blocks could be used to trigger a "flip-flop" such as a Schmitt Trigger circuit, which in turn could control the "Off" "On" periods of the video switch. Such a circuit configuration would satisfy the most basic requirements of the present invention, however, due to the inherent delay throughout the gating circuitry, i.e., through the amplifier and "flip-flop," the video pulse train would arrive at the output a fraction of a microsecond before the switching gate. Thus in such a system, a portion of the normal video corresponding to a "clutter" block will be passed during the time MTI video is required and pulse train would appear at the output of the video switch. The effect on a PPI presentation will be discussed in connection with FIGURE 3. In such a simplified configuration, a certain percentage of the main object of complete suppression of clutter masses exceeding the normal video pulse width is lost.

Figure 3:
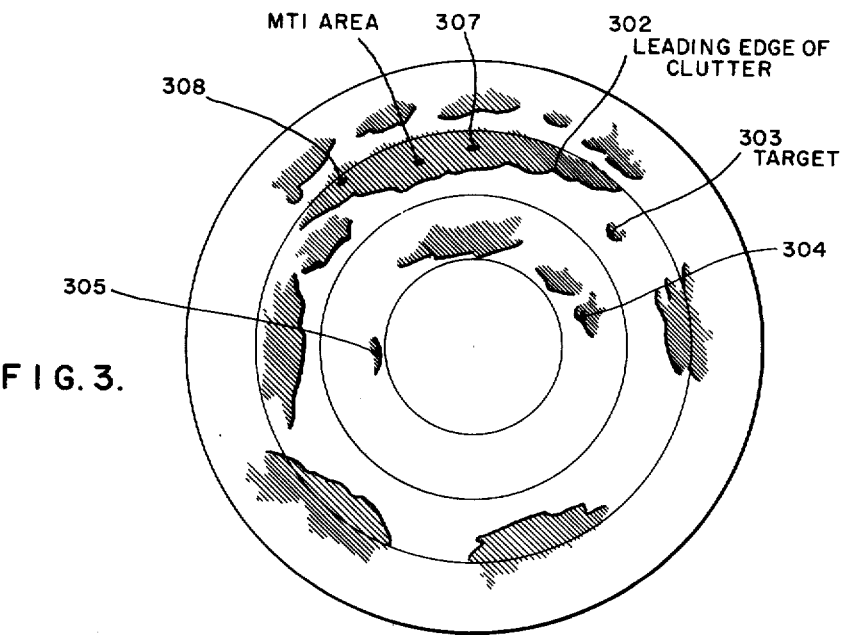
FIGURE 3 shows a PPI video presentation showing an automatic MTI/normal presentation without the "leading edge" of the clutter suppressed.

FIGURE 3 illustrates a typical video display wherein the leading edges of the video pulse trains (corresponding to "clutter" masses) are not suppressed. The shaded portions, of which 301 is typical on FIGURE 3, represent the areas in which the MTI video is switched into the video display. The dark borders, of which 302 is typical, show the leading edges of the said normal video pulse train. Targets 303, 304, 305, 306, 307 and 308 represent aircraft and/or short echo ground reference targets.

Figure 4:
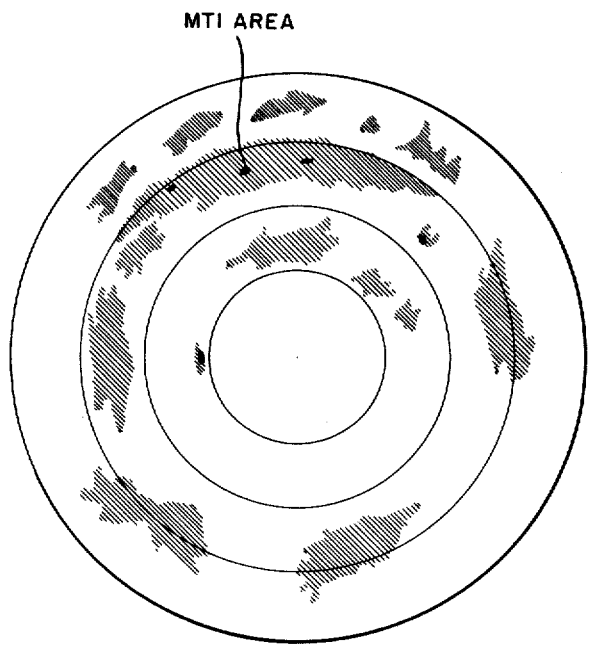
FIGURE 4 shows the same PPI video presentation with the leading edge of the clutter suppressed.

FIGURE 4 shows the same display shown in FIGURE 3 with complete suppression of the normal video pulse train in accordance with the preferred embodiment of the present invention as previously described. Additional modifications and variations falling within the scope and spirit of this invention will suggest themselves to those skilled in the art, accordingly, it is not intended that the scope of this invention be limited to the embodiment shown, the description and drawing being intended to be illustrative only.

What is claimed is:

1. An electronic switching device adapted to pass a first or second signal train alternatively as a function of the presence or absence of signal blocks within said second signal train comprising: an electronic switching circuit responsive to a gating signal for passing said first signal train when said gating signal is applied thereto and for passing said second signal train when said gating signal is not applied; means for generating and applying said gating signal to said switching circuit whenever any of said signal blocks in said second signal train persists for a time exceeding a predetermined recognition time; means for delaying said first and second signal trains by substantially equal amounts greater than said recognition time; and means for stretching said gating signal in time beyond the termination of a corresponding one of said signal blocks as delayed by said last named means.

2. The invention set forth in claim 1 further defined in that said electronic switching device is responsive to repetitive video frequency signal trains as characteristic of pulsed radar system video, said signal blocks comprise relatively long duration fixed target echo signals, and said first and second signal trains are MTI and "normal" video respectively.

3. An electronic switching device adapted to pass a first or second signal train alternatively as a function of the presence or absence of signal blocks exceeding a predetermined time duration within said second signal train comprising: a gated electronic switching circuit responsive to a gating signal which has alternate first and second conditions, said switching circuit acting to pass said first signal train during said first condition and said second train during said second condition; means for delaying said first and second signal trains by substantially equal amounts prior to said switching circuit; means for generating said gating signal; and means for causing said gating signal to assume said first condition beginning whenever any of said signal blocks in said second signal train persists for a time exceeding said predetermined time duration, the said first condition of any of said gating signals bracketing in time the one of said signal blocks corresponding thereto.

4. The invention set forth in claim 3 further defined in that pulse stretching means coupled to said means for generating said gating signal are included to insure that said gating signal does not terminate until after termination of a corresponding one of said signal blocks as delayed by said means for delaying said first and second signal trains.

5. In a pulsed radar system adapted to develop a first video signal train including only moving target signals and also a separate second video signal train including both moving and fixed target signals, a device for automatic switching within any range time base interval from said second to said first video signals on the basis of duration of any target signal block occurring in said second video train and for remaining so switched at least as long as said block persists, comprising the combination of: means for generating a gate signal beginning within a predetermined delay period after the beginning of one of said signal blocks; video delay means for delaying said first and second video signal trains equally but separately by an amount exceeding said predetermined delay period; means for stretching said gate signal whereby a corresponding one of said blocks as delayed by said video delay means falls entirely within the time of occurrence of said gate signal; and electronic switching means responsive to said gate signal and both of said delayed video signal trains for effecting said automatic switching, thereby to develop an output signal which comprises said second video signal train as well as automatically selected portions of said first signal train.

6. A video switching system comprising the combination of: first and second inputs for accepting first and second video trains respectively; separate means connected to said first and second inputs for separately delaying said first and second video trains by a first predetermined interval, thereby producing delayed first and second video trains; means connected to said second input for producing a first gate signal beginning if and when a given video signal at said second input persists beyond a second predetermined interval, said gate signal being also delayed with respect to signals at either of said inputs by an amount less than said first predetermined interval and automatically terminating substantially simultaneously with the cessation of said given video signal; second gate generating means associated with and dependent for operation on said means for producing a first gate signal and adapted to generate a second gate signal of substantially the same duration as said first gate signal but delayed therefrom by a third predetermined interval; means associated with both said means for producing first and second gate signals for developing a composite gate signal beginning at the start of said first gate signal and ending at the termination of said second gate signal; video switch means responsive to both said delayed first and second video trains and adapted to be controlled by said composite gate signal, thereby to pass said delayed second video train at all times except during the presence of said composite gate signal.

7. The invention set forth in claim 6 in which said means associated with both said means for producing first and second gate signals for developing a composite gate signal is followed by pulse stretching means including a delay line and a mixing circuit having two inputs, one of which is connected to said composite gate and the other to said composite gate through a delay line, whereby said composite gate is caused to terminate later in time than the termination of the corresponding video signal.

8. A video switching device adapted to select between first and second synchronous video signal trains alternatively as a function of the presence or absence of signal blocks exceeding a predetermined time duration within said second signal train comprising: first and second video inputs connected to accept said first and second signal trains respectively; a gated electronic video switching circuit having an output, and first and second switch inputs, said switching circuit also being responsive to a gating signal having first and second conditions whereby video signals at said first switch input are passed to said output during said first condition and video signals at said second switch input are passed to said output during said second condition; first delay means disposed between said first input and said first switch input, and second delay means disposed between said second input and said second switch input, for delaying said first and second signal trains substantially equally; first and second coincidence circuits each having two coincidence circuit inputs and a coincidence circuit output; a signal connection from said second video input to one input of said first coincidence circuit; additional delay means connected between said second switch input and one input of said second coincidence circuit; means for obtaining and connecting a partially delayed signal from said second delay means to both remaining inputs of said first and second coincidence circuits; a first mixing circuit having two mixing circuit inputs and a mixing circuit output, said mixing circuit inputs of said first mixing circuit being connected one to each of said coincidence circuit outputs; a second mixing circuit having two second mixing circuit inputs and a second mixing circuit output, one of said second mixing circuit inputs being connected to said output of said first mixing circuit; second additional delay means disposed between said output of said first mixing circuit and the other of said second mixing circuit inputs; and a gate generating circuit responsive to said second mixing circuit output for generating and applying said gating signal having first and second conditions to said gated electronic video switching circuit, said gate generating circuit being adapted to assume said second condition corresponding to the presence of a signal at said second mixing circuit output, thereby to effect selection of video signals at said output of said video switching circuit.

9. The invention set forth in claim 8 further defined in that said coincidence circuits are further defined as logical "and" circuits, said mixing circuits are further defined as logical "or" circuits, all of said delay means are delay lines, and said means for obtaining and connecting a partially delayed signal from said second delay means comprises a tap on the delay line which provides said last named means.

10. A video processing device adapted to accept a plurality of mutually synchronized signal trains and to pass to an output only signals contained in a selected one of said signal trains during the presence of signal blocks exceeding a predetermined time duration in a second selected one of said signal trains, comprising: a gated video switching circuit adapted to receive said plurality of signal trains; means for delaying each of said signal trains by a first predetermined time interval before application to said switching circuit, and for connecting said delayed signal trains to said switching circuit; and logical means connected to and for comparing said second selected signal train with itself delayed by a second predetermined time interval less than said first predetermined time interval, and with itself delayed by a third predetermined time interval greater than said first predetermined time interval, said means being adapted to generate and apply to said video switching circuit a gate for causing said switching circuit to pass only said selected one of said signal trains when a signal block in said second selected one of said signal trains exceeds said predetermined time duration.

11. The invention set forth in claim 10 further defined in that pulse stretching means are included between said logical means and said gated video switching circuit, thereby to insure that said gate does not terminate until after said signal block in said delayed signal trains terminates.

References Cited in the file of this patent
UNITED STATES PATENTS

| | | |
|---|---|---|
| 2,577,827 | Tompkins | Dec. 11, 1951 |
| 2,740,963 | Shuler et al. | Apr. 3, 1956 |
| 2,784,310 | Cowan | Mar. 5, 1957 |
| 2,879,504 | Howell et al. | Mar. 24, 1959 |